United States Patent [19]

Reith et al.

[11] Patent Number: 4,480,879
[45] Date of Patent: Nov. 6, 1984

[54] ROLLING BEARING ARRANGEMENT FOR LENGTHWISE MOVEMENT OF A HOUSING ON ONE OR TWO MUTUALLY PARALLEL RAILS

[75] Inventors: Walter Reith, Bad Bocklet; Lothar Walter, Schweinfurt, both of Fed. Rep. of Germany

[73] Assignee: SKF Kugellagerfavriken GmbH, Schweinfurt, Fed. Rep. of Germany

[21] Appl. No.: 405,436

[22] Filed: Aug. 5, 1982

[30] Foreign Application Priority Data

Aug. 7, 1981 [DE] Fed. Rep. of Germany ....... 3131321

[51] Int. Cl.³ ......................... F16C 29/06; F16C 29/00
[52] U.S. Cl. ..................................... 308/6 C; 308/6 R
[58] Field of Search .............. 308/6 C, 6 R, 3 R, 3 A, 308/6 B, 6 A; 464/178, 168, 167

[56] References Cited

U.S. PATENT DOCUMENTS

| | | | |
|---|---|---|---|
| 3,436,132 | 4/1969 | Wiesler | 308/6 C |
| 3,994,539 | 11/1976 | Gottlieb | 308/6 R |
| 4,311,348 | 1/1982 | Olschewski et al. | 308/6 C |

Primary Examiner—Stuart S. Levy
Assistant Examiner—Thomas Hannon
Attorney, Agent, or Firm—Yuter, Rosen & Dainow

[57] ABSTRACT

The invention relates to a rolling bearing arrangement for lengthwise movement of a housing (2) on one or two mutually parallel rails (1, 40, 49) with torque transmission, in which one cylindrical outer surface sleeve section (4) is arranged in a common housing on each side of a longitudinal central plane (3) of the rail and the inside of each sleeve section (4) guides two or more rows of rolling bodies (8), whereby the envelope circle diameter (14) under the loaded rolling bodies (8) of the rows of each sleeve section (4) and the diameter (15) of the cylindrical outer surface (16) of the respective sleeve section (4) have a common center point (17) in cross section.

In order to prepare this rolling bearing arrangement from a conventional full cylindrical rolling bearing in an economical type and manner and to ensure a shock-free rolling of the rolling bodies on and off, the common center (17) of a sleeve section (4) is arranged displaced opposite to the respective other sleeve section (4) at a distance transverse to the longitudinal center plane (3) of the rail (1, 40, 49). The individual sleeve sections (4) are produced by longitudinally slitting a conventional full cylinder sleeve.

3 Claims, 6 Drawing Figures

ROLLING BEARING ARRANGEMENT FOR LENGTHWISE MOVEMENT OF A HOUSING ON ONE OR TWO MUTUALLY PARALLEL RAILS

This invention relates to a rolling bearing arrangement for lengthwise movement of a housing on one or two mutually parallel rails with torque transmission, in which a sleeve section having a cylindrical outer surface is affixed in a common housing arranged on each side of a longitudinal center plane of the rail (s) and two or more rows of rolling bodies are guided in the inside of each sleeve section. The loaded rolling bodies run between an axially extending outer race in the bore of the sleeve section and the radially opposite-lying inner race formed on the rail, whereby the envelope circle diameter under the loaded rolling bodies of the rows of each sleeve section and the diameter of the cylindrical outer surface of the respective sleeve section in cross-section have a common center point.

In a known rolling bearing arrangement of the specified type, the sleeve of a conventional completely cylindrical rolling body for lengthwise movement is split into sleeve sections by axial separating slits, whereby at least one sleeve section in the housing is positioned opposite the rail by positioning means, so that a row of loaded balls radially engages in a longitudinally extending race groove in the rail and thereby can transmit the torque of the housing about the longitudinal axis to the rail (DE-GM 8 029 743). In this known rolling bearing arrangement very precise race grooves must be formed along the entire length of the rail. In order to transmit higher torque, the depth of the longitudinally extending race grooves cannot always be made sufficiently large, without the stiffness of the rail thereunder suffering. The running in and running out kinematics of the rolling bodies into the loaded zone or out of this zone is not always realized without injurious running in and running out shocks on the sides of deep race grooves in the rail.

The invention solves the problem of providing a rolling bearing arrangement for lengthwise movement of a housing on one or on two mutually parallel rails of the specified type, which are produced starting with a conventional full cylindrical rolling bearing for lengthwise movement for the transmission of higher torque. This rolling bearing arrangement should moreover be such that its structure and manner of construction are economical. Moreover, the rolling off of the rolling bodies in the rolling bearing arrangement should result in the shock-free running in and running out of the rolling bodies that transmit torque.

In the arrangement in accordance with the invention no race grooves need be worked into the shaft, so that the preparation of the inner race for the rolling bodies on the rail is essentially simplified. The individual sleeve sections of the rolling bearing arrangement can be produced by longitudinally slitting a conventional complete cylindrical sleeve (without torque transmission). Since the inner races for the loaded rolling bodies of each sleeve section are formed as cylindrical sections of circular cross section on the rail, a simple sealing ring section with sealing lips can also be used, which, for example, can be held without further means by lengthwise slitting of the completely cylindrical sleeve having sealing rings.

This produces an extremely economical construction of the rolling bearing from unitary completely cylindrical sleeves that can be produced by mass production (sleeves with cage, rolling bodies and sealing rings).

Advantageous further embodiments of the invention are described in the dependent claims. In one embodiment only a single rail need be provided for the transmission of higher torque in spite of greater radial load capacity, the rail extending through a longitudinally directed receiving bore of the housing.

The corresponding rolling bearing arrangement accordingly saves space and is economically formed.

Further advantageous arrangements of the rolling bearing arrangement, which additionally especially enhance the economy of production of the wheel bearing arrangement, are described.

The rolling bearing arrangement for lengthwise movement of a housing on one or on two mutually parallel rails with torque transmission according to the invention is more clearly explained in the following description of several embodiments, which are illustrated in the drawings. They show.

Figure 1:
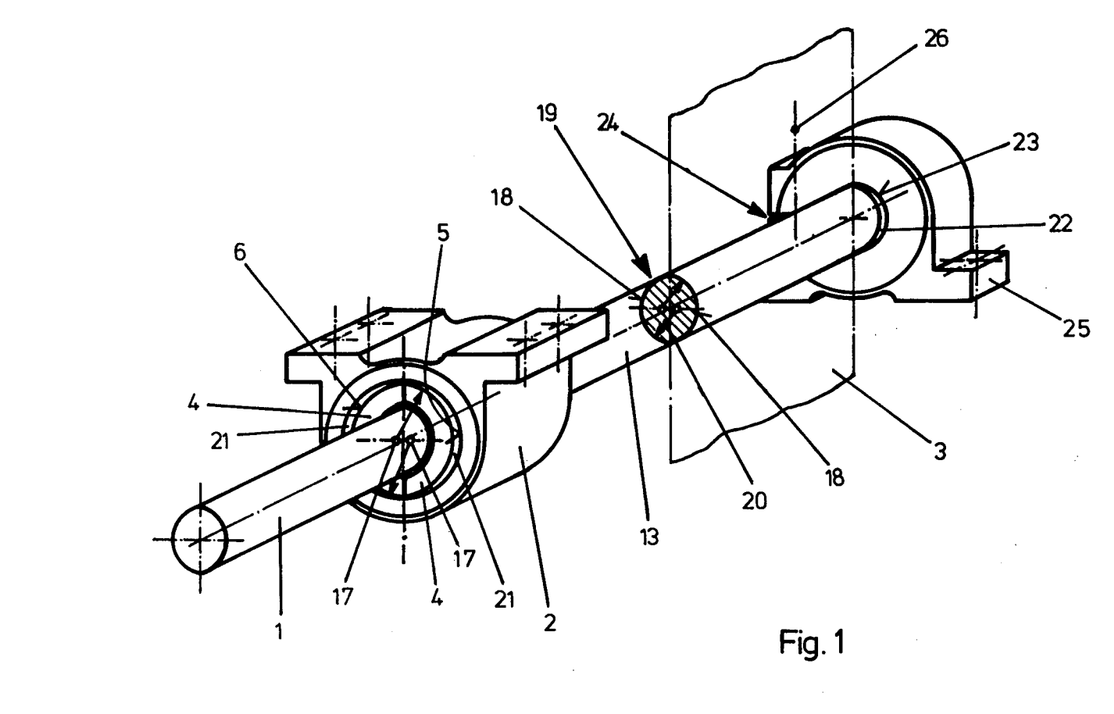
FIG. 1, a perspective view of a rolling bearing arrangement for lengthwise movement of a housing on a rail.

FIG. 1 shows a rail 1 and a housing 2 which is supported to be lengthwise moveable on the rail 1.

A sleeve section 4 is held firmly in the common longitudinally directed receiving bore 5 of the housing 2 on each side of the longitudinally central plane 3. Each sleeve section 4 is formed cylindrically on its outer surface 6 and extends over a circumferential angle which is somewhat smaller than 180°. Three rows of ball-shaped rolling bodies 8 (see the illustration in FIG. 3) are arranged in the inside of each sleeve section in the above embodiment. These three rows of rolling bodies 8 are guided in a known manner in a cage with a longitudinally directed race 10 for the loaded rolling bodies 8, a longitudinally directed race 11 for the nonloaded rolling bodies 8 and connecting turn-around races in the inside of the sleeve section 4 connecting these two races 10, 11 with one another.

The loaded rolling bodies 8 of each row at any time between the axially extending outer race 12 in the bore of the respective sleeve section 4 and one of the radially opposite inner races 13 of the rail 1.

Figure 3:
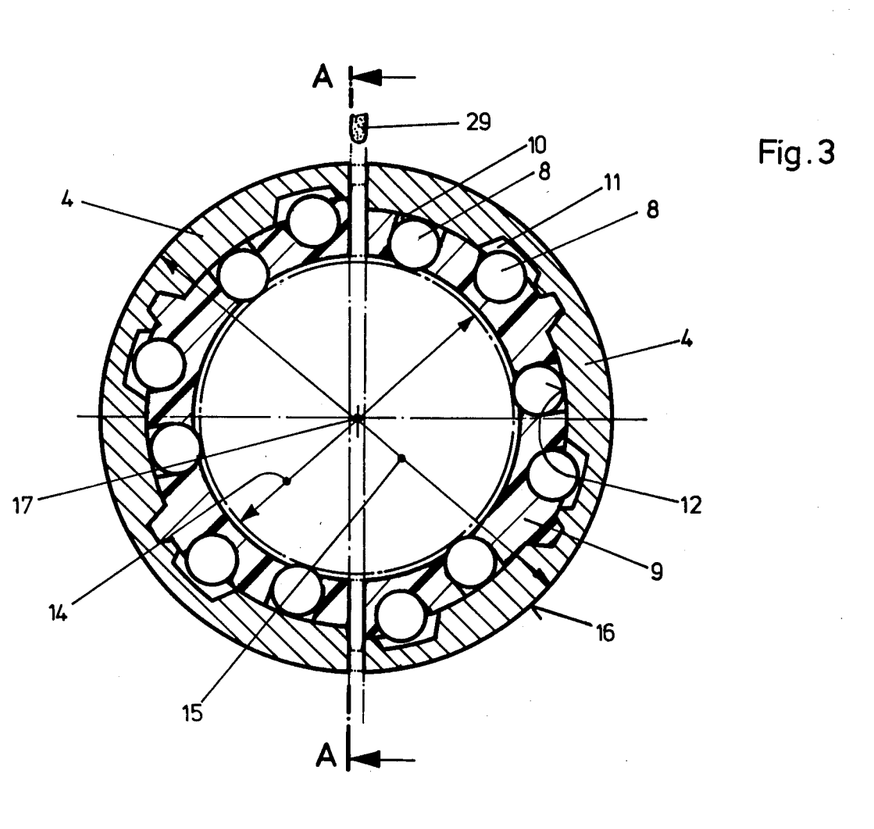
FIG. 3, a cross-section through a complete cylinder sleeve for the production of two sleeve sections in the arrangement shown in FIG. 1.

The circular envelope diameter 14 under the loaded rolling bodies 8 of the three rows of each sleeve section 4 and the diameter 15 of the cylindrical outer surface 16 of the corresponding sleeve section 4 has a common center point 17 (FIG. 3).

From FIG. 1 it is seen that the common middle point 17 of one of the sleeve sections 4 is arranged at a distance transverse to the longitudinal plane 3 of the rail 1, opposite the common middle point 17 of the corresponding other sleeve section 4. Thereby the inner races 13 of the loaded rolling bodies 8 of each sleeve section 4 are formed on lengthwise extending cylindrical sections 18 of the rail 1, each section having a circular cross section 19, closely fitting the envelope circle 14 of the respective sleeve section 4.

In the above embodiment both of the sleeve sections 4 are located in a common longitudinally directed receiving bore 5 of the housing 2, whereby their concave sides are directed toward one another. Thereby the width of the rail 1 between its two cylindrical sections 18 transverse the longitudinal central plane 3 is smaller than the sum of the half diameters 20 of these two cylindrical sections 18. The receiving bore 5 of the housing 2 is formed as a complete cylinder with a diameter corresponding (about the same size) to the diameter 15 of the outer surface 16 of both sleeve sections 4. An insert 21 having a crescent-shaped cross section is inserted with interference fit between the outer surface 16 of each sleeve section 4 and the receiving bore 5 of the housing 2.

The two sleeve sections 4 are moreover formed identically and are installed in the housing 2 symmetrically with respect to the longitudinal center plane 3. They are easily produced starting with a completely cylindrical sleeve by longitudinally slitting the sleeve with a cutting wheel 29 (FIG. 3).

The rail 1 is held in the cylindrical bore 23 of the bearing support 25, provided with slits 24, by two diametrically opposite crescent-shaped inserts 22 or by a full cylindrical pin whose diameter is about as large as the greatest diameter of the rail 1, which has a "lemon-shaped" cross section. The width of the slits 24 and therewith the diameter of the bore 23 can be changed, and the rail 1 can be held firmly secure against turning in the bore 23 of the bearing support 25 by clamp screws 26.

Figure 2:
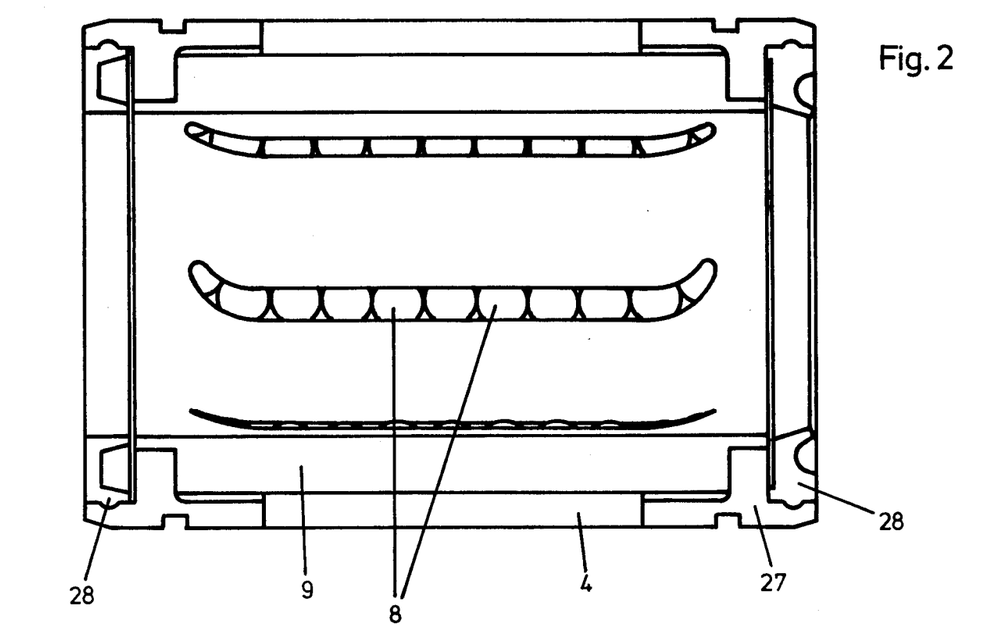
FIG. 2, an enlarged plan view of a sleeve section of the rolling bearing arrangement shown in FIG. 1.

It is apparent from the illustration of FIG. 2 that an end ring section 27 is affixed to the cage 9 on each side of the sleeve section 4, each end ring section 27 carrying a sealing lip 28 corresponding to the circumferential angle of the sleeve section 4 for sealingly sliding on the rail 1.

The two sleeve sections 4 are securely held against turning with respect to the rail 1 as a result of the lemon-shaped cross section of rail 1 with the two longitudinally extending cylinder sections 18 and the circular envelope diameter 14 adapted to this cross section, so that torque can be transmitted between the rail 1 and housing 2 in both turning directions.

Figure 4:
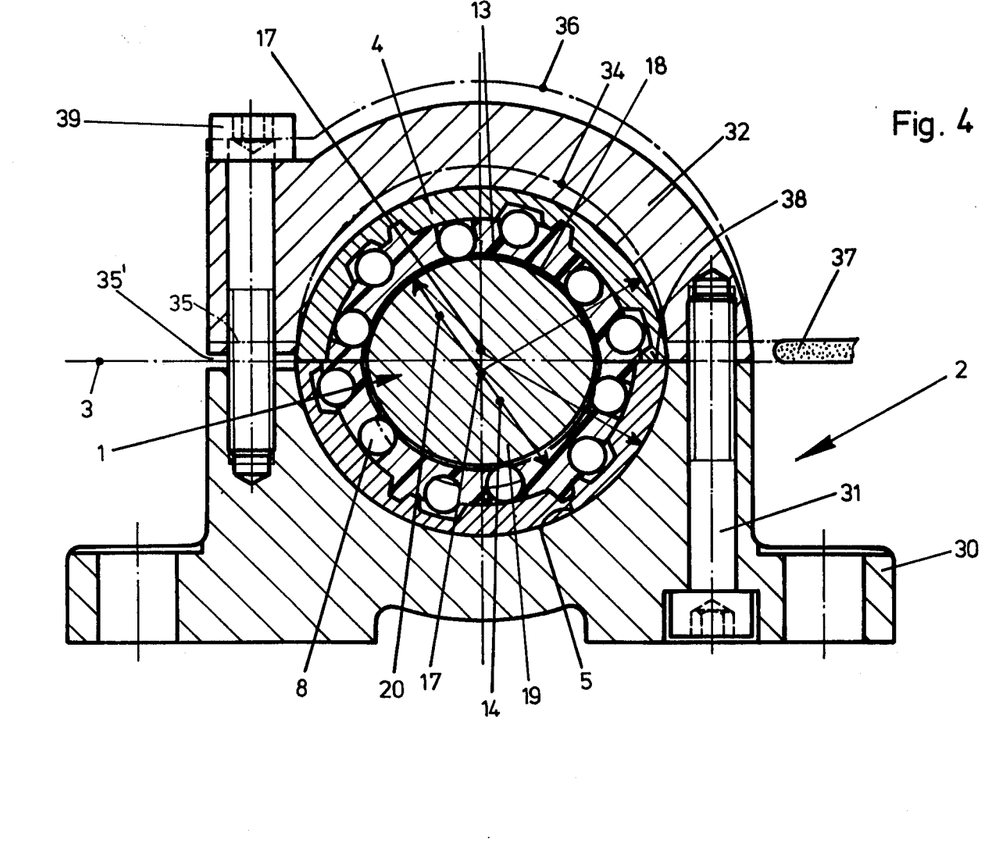
FIG. 4, a partially sectioned side view of a modified rolling bearing arrangement for lengthwise movement of a housing on a rail.

A modified rolling bearing arrangement for longitudinal movement of a housing 2 on a rail 1 is illustrated in FIG. 4, in which the housing 2 consists of a base 30 and a cap 32 connected firmly thereto by screw 31.

The housing 2 can be prepared starting with a housing 36 having a cylindrical bore 34 and slit 35, which housing is used in the conventional manner for rolling bearings with completely cylindrical sleeves (FIG. 4). In order to adapt the housing 36 to a rolling bearing arrangement providing torque transmission, it is simply divided at the cap 32 and corresponding base 30 by cutting off with a cutting wheel 37.

The rail 1 described in the previous embodiment and the two respective sleeve sections 4 in the housing 2 are installed in the rolling bearing arrangement illustrated in FIG. 4. The common center point 17 of the sleeve section 4 installed in the cap 32 is arranged displaced opposite to the common center point 17 of the sleeve section 4 installed in the base 30 at a distance transverse to the longitudinal central plane 3 of the rail 1. Thereby the inner races 13 for the loaded rolling bodies 8 of each sleeve section 4 are formed at any time by the longitudinally extending cylindrical section 18 of the rail 1 closely fitting the circular envelope diameter 14 of the corresponding sleeve section 4. The two sleeve sections 4 are located in a common longitudinally extending receiving bore 5 of the housing 2, so that their concave sides are directed toward one another and the cut surfaces 38 of the two sleeve sections 4 approach confronting positions.

After inserting the two sleeve sections 4 in the receiving bore 5 of the housing 2, one or more screws 39 are inserted in receiving holes in the cap 32 and screwed into opposing threaded holes of the base 30.

These screws 39 bridge over the slits 35' between the cap 32 and the base 30. The cap 32 is elastically strained and the two sleeve sections 4 are adjusted to be free of play in the receiving bores 5 of the housing 2 with respect to the rail 1 by screwing the screws 39 in the threaded holes of the base 30.

A modified rolling bearing arrangement for lengthwise movement of a housing on two mutually parallel having a round rails 40 cross-section is illustrated in FIG. 5, in which again a torque can be transmitted between the housing 2 and the rails 40 in both turning directions. A sleeve section 4 is arranged in a longitudinally directed cylindrical recess 42 in the common housing 2 on each side of the longitudinal central plane 3 of the two rails 40. The sleeve sections 4 are as precisely constructed as in the sleeve section of the previously discussed embodiment. They are identically formed, and they are also symmetrically positioned with respect to the longitudinal center plane 3 of the two rails 40 in the housing 2.

Figure 5:
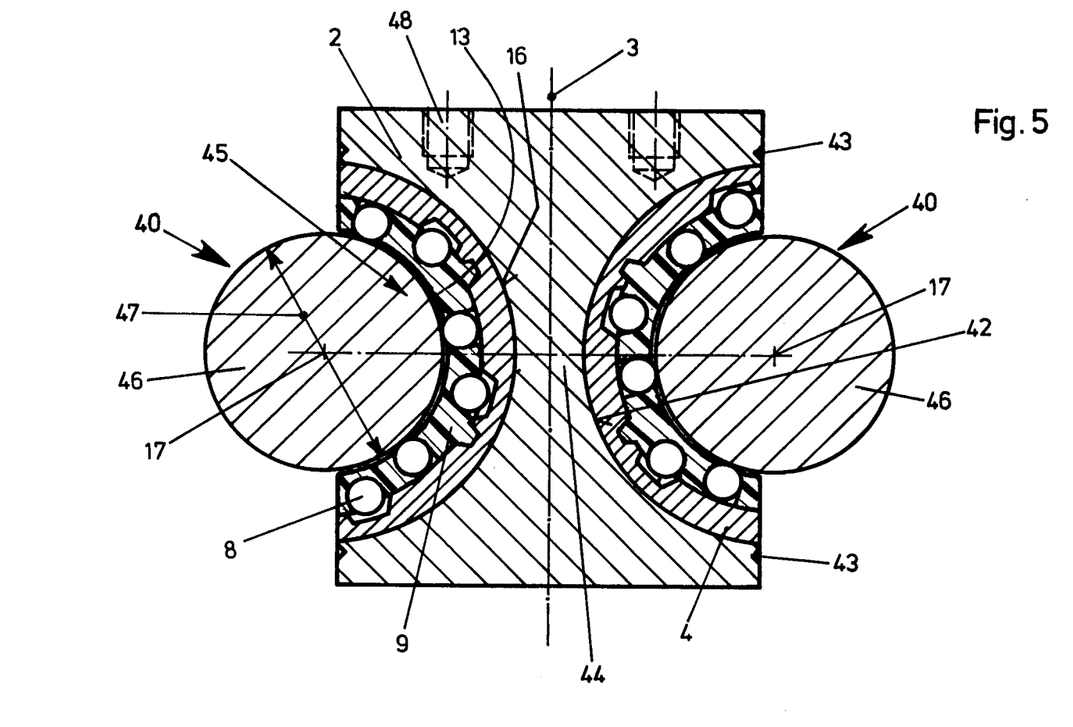
FIG. 5, a partially sectioned side view of a rolling bearing arrangement for lengthwise movement of a housing on two rails.

Each sleeve section 4 is secured against turning in the recess 4 by peening 43 at the ends of the recesses 42, and the sleeve sections are arranged in such a way that their concave sides are directed away from one another.

The common center point 17 of one of the sleeve sections 4 is arranged displaced opposite to the common middle point 17 of the corresponding other sleeve section 4 at a distance transverse the longitudinal central plane 3 of the two rails 40. A stiff firm longitudinal web 44 in the housing 2 thereby exists between the oppositely facing cylindrical outer surfaces 16 of the two sleeve sections 4.

The inner races 13 of the loaded rolling bodies 8 of each sleeve section 4 are longitudinally extending cylindrical sections 45 of circular-shaped cross-section 46 of rails 40 narrowly fitting one of the circular envelope diameters 14 (FIG. 3) of the two sleeve sections 4. This means that the diameter 47 of each rail 40 is of the same size as the circular envelope diameter 14 of the respective sleeve section 4.

Screw holes 48 are formed in the housing 2 for affixing an attachement or the like (not shown). The two sleeve sections 4 are radially loaded in opposite directions upon the application of a torque force on the housing 2 about its longitudinal axis in one turning direction or the other.

In the rolling bearing arrangement illustrated in FIG. 6 again the sleeve sections 4 used in the previous embodiment are assembled in a common housing 2. Both sleeve sections 4 are arranged seated in a common longitudinally extending receiving bore 5 of the housing 2 on each side of the longitudinal central plane 3. The housing 2 guides lengthwise movement on the two mutually parallel rails 49 and can thereby take on a torque in both turning directions. The two rails 49 have circular cross sections and contact and/or support themselves mutually along the longitudinal central plane 3.

Figure 6:
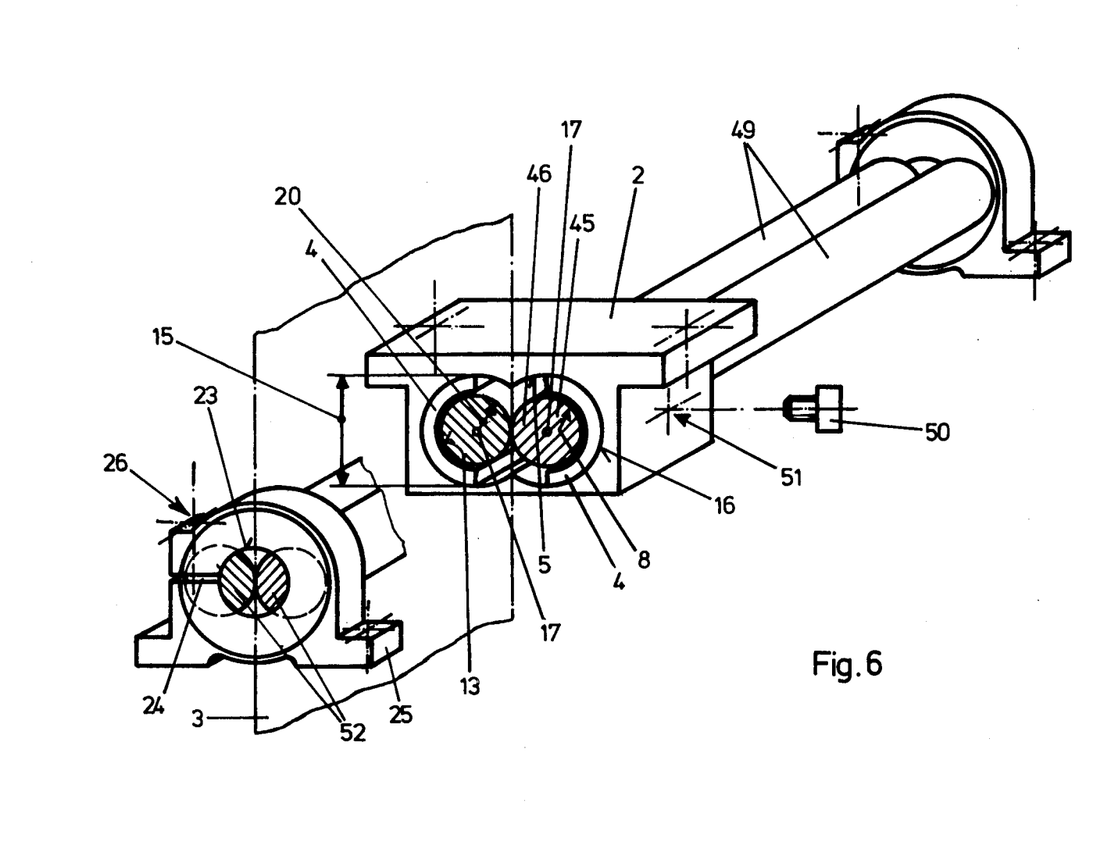
FIG. 6, a perspective view of a modified rolling bearing for lengthwise movement of a housing on two rails with a transversely split housing.

The common center point 17 of the sleeve sections 4 lies on the center line of the respective rails 49. For the remainder the two sleeve sections 4 are inserted in the housing 2 in such a manner that the common center point 17 of one of the sleeve sections 4 is arranged opposite to the common center point 17 of the respective other sleeve section 4 at a distance transverse to the longitudinal center plane 3 of the two rails 49. The inner race 13 of the loaded rolling bodies 8 of each sleeve section 4 is formed by the longitudinally extending cylindrical section 45 of the rail 49 closely fitting the circular envelope diameter 14 of the corresponding sleeve section 4. In the above case the width of the two rails 49 between their two cylindrical sections 45 transverse to the longitudinal central plane 3 is twice as large as the sum of the radius 20 of these two cylindrical sections 45. As a result the receiving bore 5 of the housing 2 is formed by two cylindrical longitudinal openings passing through the housing parallel to one another and intersecting along the longitudinal central plane 3. The diameter of each of the longitudinal openings is as large as the diameter 15 of the cylindrical outer surface 16 of the sleeve section 4 in this position.

The sleeve section 4 (FIG. 6) installed on the right side in the housing 2 is displaceably arranged by means of the placement opposite the longitudinal center plane 3 of the two rails 49 in the housing. The means of installation in the above case are formed by a screw 50 arranged such that it presses against the outer surface 16 of the sleeve section 4, which is shown in FIG. 6 in the unscrewed state from the threaded hole 51 of housing 2. The facing surface of the screw 50 presses against the outer surface 16 of a sleeve section 4 and adjusts it against the rail 49 and the other sleeve section 4 in a play-free manner upon screwing the screw 50 in the threaded hole 51.

A partial cylindrical shoulder 52 is formed symmetrically to the longitudinal central plane 3 on both ends of the rail 49, the shoulders being fitted with an interference fit in the lengthwise direction in the full cylindrical bore 23 of the bearing support 25. The bearing support 25 is constructed exactly as the bearing support illustrated in FIG. 1. The shoulders 52 of the two rails 49 are held firmly against turning in the bore 23 of the bearing support 25 with the aid of the clamp screws 26. The structures of the above-described embodiment can be changed within the scope of the invention. Thus the two rails 40 illustrated in FIG. 5 do not need to be formed completely cylindrical. Additionally they can have a somewhat semi-circular cross-section and in this case can be produced by longitudinally splitting a completely cylindrical rod in a lengthwise direction. Moreover, the two rails 49 illustrated in FIG. 6 need not be formed completely cylindrical. In many cases it can be advantageous to produce the inner races 13 of the two sleeve sections 4 on an individual (unseparated) rail, for example, by cold or hot pressing of a round rod in a die with shaping of two diametrically opposite cylindrical section. We claim:

1. In a rolling bearing arrangement for lengthwise movement of a housing on a pair of rails, wherein torque is transmittable between said housing and rail, the improvement wherein a pair of sleeve sections is arranged in said housing, each of said sleeve sections having a cylindrical concave surface, said concave sections being directed away from one another, each sleeve having at least one continuous row of rolling bodies and having a longitudinally extending race for loaded rolling bodies and a return race for unloaded rolling bodies in each continuous row, said loaded rolling bodies of each of said sleeve sections engaging a separate one of said rails, the centers of curvature of said sleeve sections being displaced from one another on opposite sides of a longitudinal central plane extending transverse of the plane joining the centers of the two rails and substantially parallel to the longitudinal axes of said rails, the inner race for the loaded rolling bodies of each sleeve section comprising a longitudinally extending cylindrical section of the rail corresponding to and concentric with the respective sleeve section.

2. A rolling bearing arrangement for lengthwise movement of a housing on a pair of mutually parallel cylindrical rail sections of partially circular cross section disposed correspondingly on opposite sides of a longitudinal center plane, wherein torque is transmittable between said housing and said rail sections, the improvement wherein a pair of sleeve sections is arranged in said housing, each of said sleeve sections having a cylindrical convex outer surface of circular cross section and a concave inner surface, each of said sleeve sections being arranged such that said inner surface of each sleeve section confronts the cylindrical surface of the respective one of said rail sections and such that said outer surface of each sleeve section and the cylindrical surface of said rail section are concentric, and wherein at least one continuous row of rolling bodies is provided between each said rail section and each confronting sleeve section, said rolling bodies of each row being alternatingly loaded and unloaded, each sleeve section having a longitudinally extending outer race for said loaded rolling bodies and a return race for said unloaded rolling bodies, and said inner race for said loaded rolling bodies being formed by the cylindrical surface of said confronting rail section, and the center of curvature of one of said rail sections is displaced relative to the center of curvature of the other of said rail sections, said housing having a longitudinally directed receiving bore, and said sleeve sections being positioned in said bore with their concave inner surfaces directed mutually toward each other, said rail being positioned between said inner surfaces, the width of said rail along a line perpendicular to said longitudinal central plane is smaller than the sum of radii of curvature of said rail sections.

3. A rolling bearing arrangement according to claim 2, further comprising an insert inserted with interference fit between the outer surfaces of said sleeve sections and the receiving bore of said housing, said receiving bore being formed as a cylinder of circular cross section with a radius less than the radius of curvature of the outer surface of said sleeve section.

* * * * *

UNITED STATES PATENT AND TRADEMARK OFFICE
CERTIFICATE OF CORRECTION

PATENT NO.   : 4,480,879
DATED        : November 6, 1984
INVENTOR(S)  : WALTER, REITH It is certified that error appears in the above-identified patent and that said Letters Patent is hereby corrected as shown below:

Column 3, line 3, after "section" insert --18--.

Column 4, line 24, delete "having a round rails 40" and insert --rails 40 having a round cross section--.

Column 6, line 2, change "section" to --sections--.

Signed and Sealed this

Fourteenth Day of January 1986

[SEAL]

Attest:

DONALD J. QUIGG

Attesting Officer        Commissioner of Patents and Trademarks